US007730309B2

(12) United States Patent
Zimmermann

(10) Patent No.: US 7,730,309 B2
(45) Date of Patent: Jun. 1, 2010

(54) METHOD AND SYSTEM FOR KEY MANAGEMENT IN VOICE OVER INTERNET PROTOCOL

(76) Inventor: Philip R. Zimmermann, 355 More Dr., Boulder Creek, CA (US) 95006

( * ) Notice: Subject to any disclaimer, the term of this patent is extended or adjusted under 35 U.S.C. 154(b) by 951 days.

(21) Appl. No.: 11/460,621

(22) Filed: Jul. 27, 2006

(65) Prior Publication Data

US 2007/0157026 A1 Jul. 5, 2007

Related U.S. Application Data

(60) Provisional application No. 60/703,089, filed on Jul. 27, 2005.

(51) Int. Cl.
*H04L 9/32* (2006.01)
*H04L 9/00* (2006.01)
*H04M 1/66* (2006.01)
(52) U.S. Cl. .................. 713/171; 380/277; 380/283; 455/411
(58) Field of Classification Search ................ 713/171; 380/277, 283; 455/411
See application file for complete search history.

(56) References Cited

U.S. PATENT DOCUMENTS

| 5,937,066 A * | 8/1999 | Gennaro et al. ............ 380/286 |
| 6,353,891 B1 * | 3/2002 | Borella et al. ............. 726/12 |
| 6,865,681 B2 * | 3/2005 | Nuutinen .................. 726/14 |
| 7,240,366 B2 * | 7/2007 | Buch et al. ................ 726/14 |
| 2002/0059516 A1 * | 5/2002 | Turtiainen et al. .......... 713/153 |
| 2002/0129236 A1 * | 9/2002 | Nuutinen ................... 713/151 |
| 2002/0191548 A1 * | 12/2002 | Ylonen et al. .............. 370/254 |
| 2005/0010680 A1 * | 1/2005 | Zick et al. ................. 709/237 |
| 2005/0063544 A1 * | 3/2005 | Uusitalo et al. ............ 380/277 |
| 2006/0288423 A1 * | 12/2006 | Le et al. ................... 726/26 |
| 2007/0003064 A1 * | 1/2007 | Wiseman et al. ........... 380/281 |
| 2007/0053513 A1 * | 3/2007 | Hoffberg ................... 380/201 |
| 2007/0106892 A1 * | 5/2007 | Engberg .................... 713/168 |
| 2009/0249073 A1 * | 10/2009 | Wiseman et al. ........... 713/171 |
| 2009/0292920 A1 * | 11/2009 | Willey ...................... 713/169 |

OTHER PUBLICATIONS

Phillip R. Zimmermann, PGPfone owner's manual, Date: Jul. 8, 1996.*
Rosenberg, et al, RFC3261, SIP: session initiation protocol. Date: Jun. 2002.*
D. Richard Kuln, Thomas J. Walsh, Steffen Fries, Security considerations for voice over IP systems. date: Jan. 2005.*

* cited by examiner

*Primary Examiner*—Minh Dieu Nguyen
(74) *Attorney, Agent, or Firm*—Cooley Godward Kronish LLP

(57) ABSTRACT

A method and system for a secure telephone protocol are disclosed, which can be implemented using current Voice over IP (VoIP) protocols, Session Initiation Protocol (SIP, as specified in the Request for Comment (RFC) 3261 from the Internet Engineering Task Force (IETF)), Real Time Transport Protocol (RTP, as specified in RFC 3550), and Secure RTP (SRTP, as specified in RFC 3711). The secure telephone protocol can include a shared secret value that is cached and then re-used later to authenticate a long series of session keys to be used for numerous separate secure phone calls over a long period of time, thereby providing cryptographic key continuity without the need for voice authentication. In an embodiment, the secure telephone protocol can utilize the Diffie-Hellman key exchange during call setup, and AES for encrypting the voice stream.

3 Claims, 5 Drawing Sheets

METHOD AND SYSTEM FOR KEY MANAGEMENT IN VOICE OVER INTERNET PROTOCOL

CROSS-REFERENCE TO RELATED APPLICATIONS

This patent application claims priority to U.S. Provisional Patent Application No. 60/703,089, filed Jul. 27, 2005 and entitled "KEY EXCHANGE PROTOCOL," the entirety of which is incorporated herein by reference.

FIELD OF THE INVENTION

This invention relates generally to securing voice communications that have been converted to electronic format. More particularly, this invention relates to techniques and protocols for providing secure communications between users of Voice Over Internet Protocol ("VOIP") technology.

BACKGROUND OF THE INVENTION

The well known Internet Protocol ("IP") provides a method for routing information over the Internet. Protocols for converting and routing voice conversations via any IP-based protocol are termed Voice Over Internet Protocol ("VOIP"). To date, most VOIP implementations have not been optimally secured.

One existing technology applicable to VOIP protection includes public key cryptography. The well known Diffie-Hellman ("DH") key agreement method exemplifies the type of public key cryptography that could be used in securing VOIP. DH includes all variants of DH, including, for example, the classic finite field DH ("FFDH") approach as well as the elliptic curve DH approach ("ECC-DH"). In addition, a public key infrastructure ("PKI") could be used. A PKI enables users of a public network such as the Internet to securely exchange information through the use of a public and private cryptographic key pair. In many approaches, security is enhanced by provisioning and sharing the key pair via a trusted authority. A PKI provides for digital certificates that can identify individuals or organizations. Unfortunately, PKI technology includes many complexities, including notions of a certification authority (CA), a registration authority (RA), one or more directories where the certificates (with their public keys) are held, and a certificate management system. The CA often is required to be a trusted entity that issues and verifies digital certificates. A digital certificate is an electronic data element that evidences an entity's credentials. The certificate can include the public key or information about the public key, as well as other information, such as a name, serial number, expiration dates, and a digital signature of the certificate authority. Digital certificates may be kept in registries so that authenticated users can look up other users' public keys.

Securing public switched telephone network ("PSTN") phones is well known. For example, the TSD 3600 from AT&T Corporation uses several of the techniques discussed in further detail below, including hash commitment and DH key exchange. Most secure phones rely on a DH public key exchange to agree on a common session key. For example, as shown in FIG. 1, User A 102 can use VOIP software 108 executing on computing device 106 to communicate with User B 104. User B uses bump-in-the-cord VOIP 112 with Ethernet-based phone 110. As shown in FIG. 1, DH is susceptible to a man-in-the-middle ("MitM") attack. In such an attack, MitM 130 intercepts communications from User A 102 to User B 104 and, in effect, carries on two different communications sessions—one with User A via device $MitM_A$ 132 and one with User B via device $MitM_B$ 134. In doing so MitM 130 makes it appear that User A 102 and User B 104 are communicating directly, when in fact MitM is secretly eavesdropping on their communication. Due to the possibility of the MitM attack shown in FIG. 1, a way to authenticate the DH exchange is commonly provided. Some systems accomplish this by depending on digital signatures backed by a centrally-managed PKI. The complexity of PKI, however, results in significant technology commitments, time requirements and budget commitments, both at initial deployment and during ongoing operations. A preferred alternative would be to avoid PKI altogether, especially when developing secure commercial products.

Consequently, many commercial secure phones augment a DH exchange with a voice authentication digest ("VAD"), combined with a hash commitment at the start of the key exchange, to shorten the length of VAD material that must be read aloud. A VAD (also known as a short authentication string) consists of a short string or value that two users can exchange verbally to authenticate their connection and help protect against MitM attacks. Hash commitment refers to the use of an agreed-upon cryptographic hash to shorten the VAD material. No PKI is required for this approach to authenticating the DH exchange. The AT&T 3600, Eric Blossom's COMSEC secure phones, PGPfone from PGP Corporation, and Cryptophone from GSMK mbH are all examples of products that utilize this simpler lightweight approach.

Certain problems exist with the VAD and hash commitment approach, however, including inattentive users who may not execute the voice authentication procedure or unattended secure phone calls to answering machines that cannot execute the voice authentication procedure. Additionally, a VAD must be employed for each call between users.

What is needed, then, is a method for allowing a user to easily establish multiple trusted VOIP communication sessions with other previously-authenticated users without the need to perform a voice authentication for each VOIP communication session. Such a method should not rely on intermediaries or complex infrastructure technology and should easily allow authentication of future calls.

SUMMARY

Figure 1:
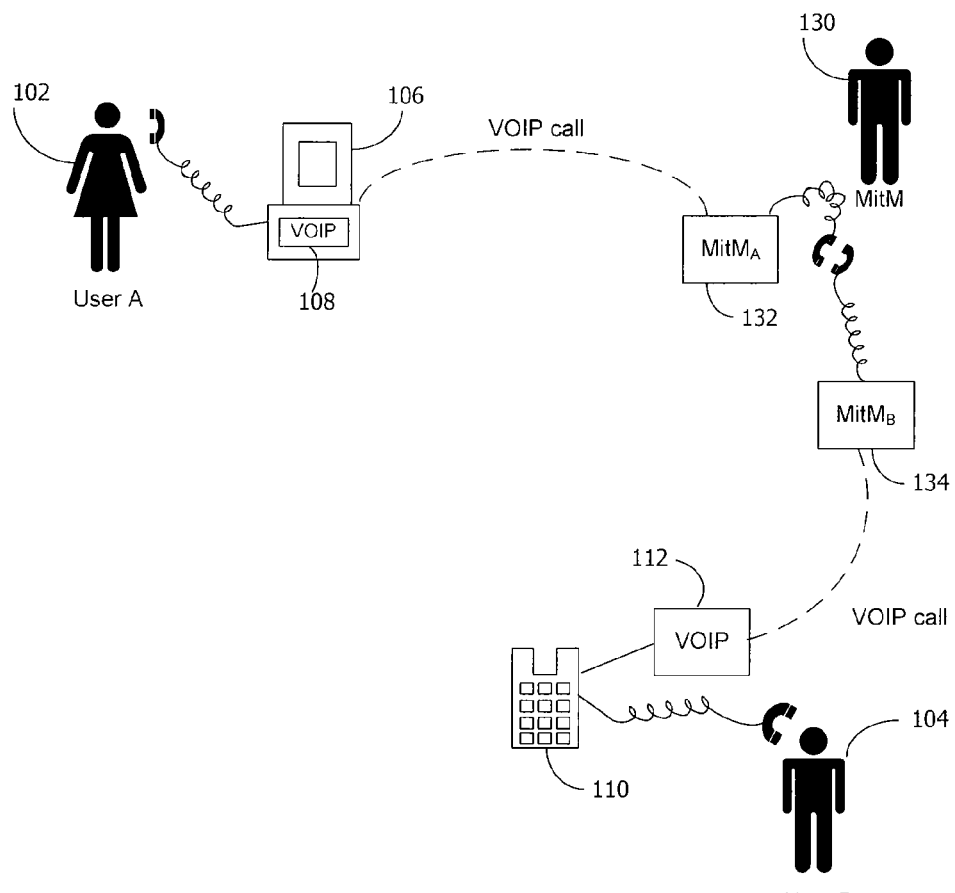
FIG. 1 is a high level network diagram of a traditional VOIP communication without security, where a man-in-the-middle attack has been performed.

According to at least some embodiments of the invention, a shared secret between two users involved in an authenticated VOIP communication session is cached and then re-used during a later VOIP communication session to authenticate that session. This can be used, therefore, to authenticate a long series of DH exchanges for secure VOIP phone calls over a long period of time without the need for the users to perform a voice authentication during each VOIP communication session. If users read aloud just one short authentication string and, upon verification, then cache a shared secret for later VOIP communication sessions to use for authentication, no new voice authentication processes need to be executed. Such a method and system obviates the need for subsequent voice authentication by keeping track of the cached shared secret on a per user basis.

If a cached shared secret is ever lost and, therefore, no longer available for authentication of DH exchanges, a new short authentication string verification procedure can be executed and the users can start over with a new cached shared secret. Subsequent voice authentication could then (again) be omitted on later calls. This approach results in cryptographic key continuity over multiple VOIP communication sessions.

Such methods and systems can provide additional benefits. For example, a VAD is easiest to implement when a graphical user interface ("GUI") or some sort of display is available, which raises the question of what to do when no display is available. Products can be made that implement secure VOIP via a local network proxy, which lacks a display in many cases. At least some embodiments of the method and system greatly reduce the need for a VAD in each and every call, thus allowing products without a GUI to be operated with much greater ease.

DETAILED DESCRIPTION

A shared secret is any information that two or more parties know but other parties do not know. As long as only authorized parties know the shared secret value, that value can be used as a way of initializing a communication session between any combination of those parties. The secure telephone protocol described herein (an embodiment of which we denote ZRTP) allows a persistent shared secret value to be used to authenticate VOIP calls between users. ZRTP provides cryptographic features lacking in other approaches to VOIP encryption. Although ZRTP uses a public key algorithm, it does not rely on a public key infrastructure (PKI). In an embodiment, ZRTP does not use persistent public keys at all. Instead, ephemeral Diffie-Hellman ("DH") with hash commitment can be utilized. ZRTP allows the detection of man-in-the-middle (MiTM) attacks by displaying a short authentication string for the users to read and compare over the phone.

A session key is a cryptographic key used for protecting a particular communication session (e.g., a single VOIP communication session between two users). ZRTP exhibits perfect forward secrecy, meaning session keys are destroyed at the end of each VOIP call, which precludes retroactively compromising the call by future disclosures of key material. Furthermore, ZRTP provides protection against a MiTM attack by providing a form of key continuity to ZRTP users. ZRTP caches a hash of key material from the prior session to be mixed in with the shared secret of the current session, which, in an embodiment, could be the shared secret of a Diffie-Hellman result. This gives ZRTP key continuity properties somewhat analogous to the well known Secure Shell ("SSH") protocol. In such an embodiment, the protections provided by ZRTP do not rely on PKI, key certification, trust models, certification authorities, or key management complexity that contribute to the current difficulties in the area of email encryption. Other complexities exist in the building, maintaining, and reliance on PKI, as evidenced by such publications as "Ten Risks of PKI: What You're Not Being Told About Public Key Infrastructure" by Carl Ellison and Bruce Schneier, and Carl Ellison's paper "Improvements on Conventional PKI Wisdom." As discussed below, however, digital signature technology could be used to achieve key continuity. Thus, ZRTP could implement a digital signature-based form of key continuity (somewhat like SSH, although the SSH approach was used for non-VOIP applications and was never used to manage keys for SRTP-based media streams).

ZRTP also does not rely on any servers and, in particular, does not rely on SIP signaling for the key management (where SIP signaling refers to VOIP call set up that utilizes the signaling layer). ZRTP performs its key agreements and key management in a purely peer-to-peer manner over the well known Real Time Protocol ("RTP") packet stream. ZRTP also supports opportunistic encryption by auto-sensing if the other VOIP client supports ZRTP. Thus, ZRTP operates primarily in the media layer and need not depend on the signaling layer. In VOIP, the media layer deals with the actual processing of the media stream (i.e., the voice processing). In contrast, the signaling layer refers to the non-media related aspects of the communication process (e.g., call set up, etc.)

As already discussed, FIG. 1 depicts a system where a MitM attack has been mounted. User A 102 and User B 104 may perceive that they are communicating directly with one another but, in fact, a third entity (i.e., the man-in-the-middle) has been able to intercept communications between the users and is thus able to hear both sides of the conversation while still allowing the two users to communicate. Forcing the MitM to solve multiple problems can significantly reduce (or completely defeat) the likelihood of the MitM's success. Some examples of widely differing problems include requiring the MitM to: (a) steal a shared secret from one of the parties, (b) be present on the very first VOIP communication session and every subsequent session to carry out an active MitM attack, and (c) solve the discrete log problem.

At least three different kinds of shared secrets (alone or in combination) can be used in the described embodiments. First, a static shared secret can be agreed upon between the two parties out-of-band in advance. A hashed passphrase would suffice. This static shared secret is used only as an initial value for the ongoing cached shared secret described below. If no static shared secret is available, the first phone call will rely entirely on a DH exchange for its first shared secret.

Second, an evolving or ongoing shared secret that is automatically changed and then cached with every new VOIP communication session can be used. This is known as a cached shared secret or a retained shared secret. In an embodiment, each new value of the ongoing secret is a function of its previous value and the new secret derived by the new DH exchange. If no cached shared secret is available (e.g., if no previous sessions exist from which a cached shared secret could be computed), an initial value for the cached shared secret can be the static shared secret that the two parties agreed to out of band.

Third, a shared secret can be determined entirely by the well known process of DH key agreement. A DH shared secret value changes with every call, based on random numbers generated by each user. An attacker may attempt a classic DH MitM attack on this secret, but this can be defeated by displaying and reading aloud a VAD (hereinafter, a short authentication string), combined with adding a hash commitment at the beginning of the DH exchange.

Finally, a combination of shared secrets from various sources (e.g., further including shared secrets from the signaling layer) could be used. Even if the signaling layer cannot be trusted, a shared secret from the signaling layer can still be used with other shared secrets since this would not compromise the integrity of the final resulting shared secret.

In an embodiment, the cached shared secret and the shared secret computed by DH can be hashed together to compute the session key for a VOIP communication session. The hash process referred to here is a cryptographic hash, which is a one-way function that can take as input data (i.e., a message) of arbitrary length and produce a fixed length value. If the cached shared secret is not available, it is omitted from the hash computation. Similarly, an HMAC is a keyed-hash message authentication code, which is a variant of the typical message authentication code (MAC). An HMAC provides further protection by combining the basic MAC process with a secret key. In the Zfone embodiment, SHA-256 is used as the hash function for all hash operations and all HMAC functions are based on SHA-256.

No DH MitM attack can succeed if the ongoing shared secret is available to the two parties, but not to the attacker. This is because the attacker cannot compute a common session key with either party without knowing the cached secret component, even if he correctly executes a classic DH MitM attack. Mixing in the cached shared secret for the session key calculation allows the cached shared secret to act as an implicit authenticator to protect the DH exchange, without requiring additional explicit HMACs to be computed on the DH parameters. If the cached shared secret is available, a MitM attack would be instantly detected by the failure to achieve a shared session key, resulting in undecryptable packets. The protocol ZRTP can easily detect this.

Figure 2:
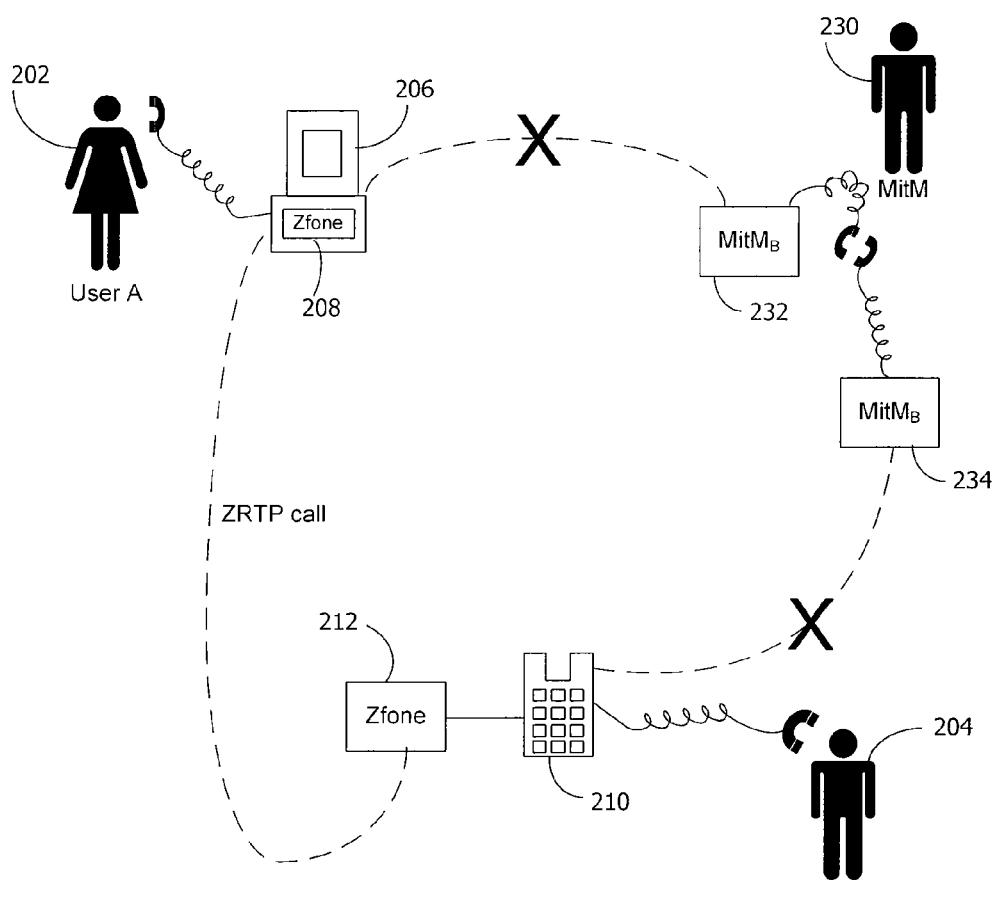
FIG. 2 illustrates a VOIP system according to an embodiment of the invention.

FIG. 2 illustrates a system that could employ the shared secret approaches described above. As shown in FIG. 2, User A and User B have established a secure VOIP call using a Zfone implementation of ZRTP. User A utilizes a software implementation of Zfone 208 on computing device 206, while User B utilizes a bump-in-the-cord implementation 212 with standard VOIP phone 210. In doing so, the users establish a VOIP communication session that is protected by ZRTP. Thus, MitM 230 will be significantly hindered in trying to attack the VOIP communications between User A 202 and User B 204. In fact, unless MitM 230 is present on the first call and all subsequent calls between the users, MitM 230 will be unable to mount a successful MitM attack and any attempts to do so will be detected by the users. If the users had not ever been in communication before or if, somehow, the shared secret of at least one of the users had been lost, User A 202 and User B 204 would have generated a VOIP session key and a new cached shared secret value. Such key continuity is useful even without voice authentication, as key continuity would still prevent the MitM from future sessions. The users would then have performed a voice authentication using a short authentication string. In the situation where both users have a cached shared secret from previous communications with each other, that cached shared secret can be combined with a DH shared secret to authenticate the two users and provide a new shared secret value.

Figure 3:
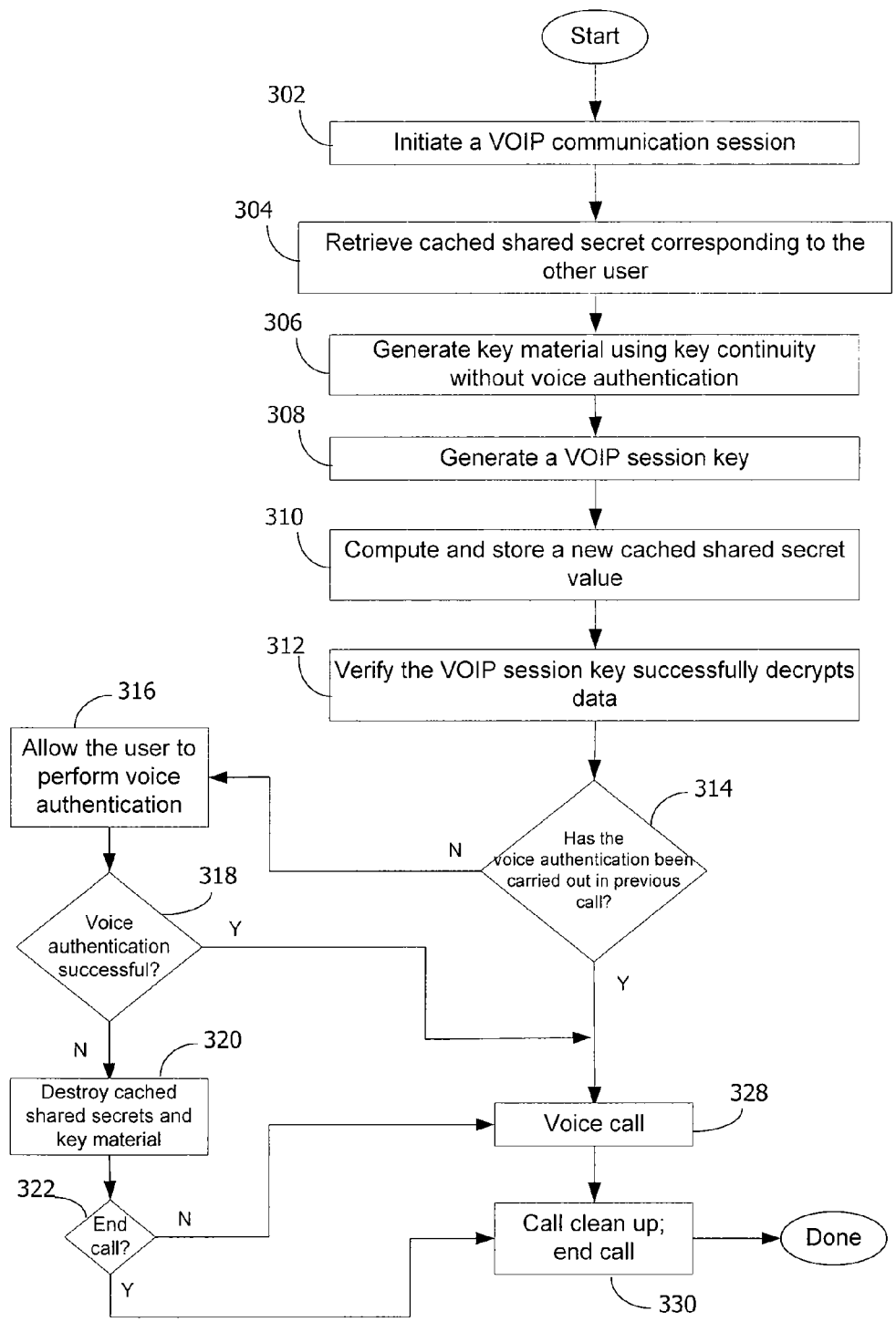
FIG. 3 is a flow chart depicting authentication in a VOIP system using key continuity, according to an embodiment of the invention.

FIG. 3 provides a flow chart depicting the steps described with respect to the exchanges between the two users shown in FIG. 2. In a step 302, a secure VOIP communication session is initiated between at least two users. In a step 304, each user retrieves the cached shared secret that it has retained from a previous communication with the other user. In the event that the users have not communicated previously or if either user has a problem with the cached shared secret, a null value is retained for the cached shared secret value. In a step 306, each user generates key material using the cached shared secret value along with other information that will only last for the length of the VOIP communication session and then exchanges a noninvertible derivative of the keying material with the other user (e.g., where, in an embodiment, the non-invertible derivative of the keying material could be a hash value that could be checked by the other user).

Computation of a VOIP session key can occur in a step 308, along with computation and storage of a new cached secret value in a step 310. These two computations are carried out and the new cached secret is stored so that even if the check for a previous voice authentication in step 314 is not successful, the users can still communicate in subsequent calls with some level of security. In a step 312, a verification can be done to ensure the VOIP session key was properly calculated by decrypting some data encrypted with that VOIP session key.

If a previous voice authentication has not been performed, the users can be allowed to perform voice authentication in a step 316. A check is then done in a step 318 of the voice authentication. If the voice authentication succeeds, all of the call setup for ZRTP has been completed, so the call commences at step 328 and, when complete, call cleanup and the ending of the call occurs in a step 330.

In the event that the voice authentication in a step 318 does not succeed, all shared secret and keying information can be destroyed in a step 320. Either user (or both users) can then be presented in a step 322 with a choice of whether to continue the call in an unsecured fashion (in a step 328) or ending the call (in a step 330).

As discussed above and as outlined in FIG. 3, ZRTP is a secure telephone protocol that allows a cached shared secret value to be used to authenticate VOIP calls between users. Using an informal type of pseudo-code or protocol description language, the protocol sequence for ZRTP between two users (Bob and Alice) could appear as follows:

```
Bob (User B)                                    Alice (User A)
=========================                       =========================
Generate Hello packet containing                Generate Hello packet containing
(Zfone version info,                            (Zfone version info,
    algorithm lists, ZfoneID B)                     algorithm lists, ZfoneID A)
Send Hello packet B --->              <---      Send Hello packet A
Receive Hello packet A <---           --->      Receive Hello packet B
Send Ack for Hello --->               <---      Send Ack for Hello
Receive Ack for Hello <---            --->      Receive Ack for Hello
                        If both Zfone IDs are the same, abort call.
                              Check Zfone version info
Bob initiates "GO SECURE"
Choose algorithms
Generates secret value svb
Compute pvb=g^svb mod p
hvb=hash(pvb)
Look up rs0 using index ZfoneID A
```

```
if rs0 is null, then
    rs0 = random string
rsID_B = HMAC (rs0, "Initiator")
(rsID is truncated to 80 bits)
Send chosen algorithms, hvb --->
                                    --->    Receive chosen algorithms, hvb
                                            Generates secret value sva
                                            Compute pva=g^sva mod p
                                            Look up rs0 using index ZfoneID B
                                            if rs0 is null, then
                                                rs0 = random string
                                            rsID_A = HMAC(rs0, "Responder")
                                            (rsID is truncated to 80 bits)
                                    <---    Send pva, rsID_A
Receive pva, rsID_A <---
Verify rsID_A matches
    expected value HMAC(rs0, "Responder")
If rsID mismatch,
    clear vadverified
    clear rs0
Send pvb, rsID_B    --->
                                    --->    Receive pvb, rsID_B
                                            Verify rsID_B matches
                                                expected value
HMAC(rs0, "Initiator")
                                            If rsID mismatch,
                                                clear vadverified
                                                clear rs0
                                            Verifies that hvb==hash (pvb)
                                            If hash verify fails
                                                MitM attack!
                                                clear vadverified?
                                                and alert the user and switch to
                                                clear mode
Compute DH shared secret                    Compute DH shared secret
DHSS = pva^svb mod p                        DHSS = pvb^sva mod p
erase svb                                   erase sva
            Both sides perform:
            s0 = SHA256(DHSS)
            If (rsID matches) :
                s0 = SHA256(s0 | rs0)
            vad = SHA256 (pva | pvb |
                            "voice authentication digest")] truncated
            srtpkey = HMAC(s0, "SRTP master key")
            srtpsalt = HMAC(s0, "SRTP master salt")
            hmackey = HMAC(s0, "HMAC session key")
            erase DHSS
            Initialize SRTP with srtpkey and srtpsalt
            Begin SRTP protocol, packets are now encrypted
            Both sides create their own confirm packet, containing:
                some known plaintext,
                local vadverified flag,
                HMAC(hmackey, chosen algorithms, and
                    all preceding fields in this packet)
                                    <---    Send Alice's confirm packet
Receive Alice's confirm packet <---
Verify it decrypts properly
If decrypt fails, abort protocol:
    Erase srtpkey, srtpsalt, and hmackey
    But keep old rs0 for next time, since it did its job
    Abort call.
compute new retained secret
for next time:
rs0 = HMAC(s0, "retained secret")
erase s0
Send Bob's confirm packet --->
                                    --->    Receive Bob's confirm packet
                                            Verify it decrypts properly
                                            If decrypt fails, abort protocol:
                                                Erase srtpkey, srtpsalt, and
                                                hmackey
                                                But keep old rs0 for next time
                                                Abort call.
                                            compute new retained secret
                                            for next time:
                                            rs0 = HMAC(s0, "retained secret")
                                            erase s0
```

-continued

```
Now both sides are using fully functioning SRTP
with correct session key. Secure Voice
conversation is now underway.
At this point, each side is aware of their own local and each other's
vadverified flag from the previous session.
If both Bob's and Alice's vadverified flags are set, then we are done.
Call is authenticated.
Else proceed with Voice Authentication procedure, which follows.
Display VAD                                    Display VAD
VAD matching is voice and human driven so it can come at any time in
the call.
Bob reads aloud 1st 3 digits ===voice===>
                              ===voice===>     Alice recognizes Bob's voice
                                               and checks digits.
                                               If VAD matches,
                                                   click VERIFIED button
                                                   which sets Alice's vadverified
                              <===voice===     Alice reads aloud 2nd 3 digits
Bob recognizes Alice's voice <===voice===
and checks digits.
If VAD matches,
    click VERIFIED button
    which sets Bob's vadverified
If VAD verify actually failed, there is a MitM attack.
User clicks FAIL button to clear vadverified and wipe out new
retained secret rs0. (Possibly abort call)
At the end of the call, erase srtpkey, srtpsalt, and hmackey.
We already erased s0, sva, svb and DHSS.
Retain local vadverified flag, and rs0.
===========================================================
```

Figure 4:
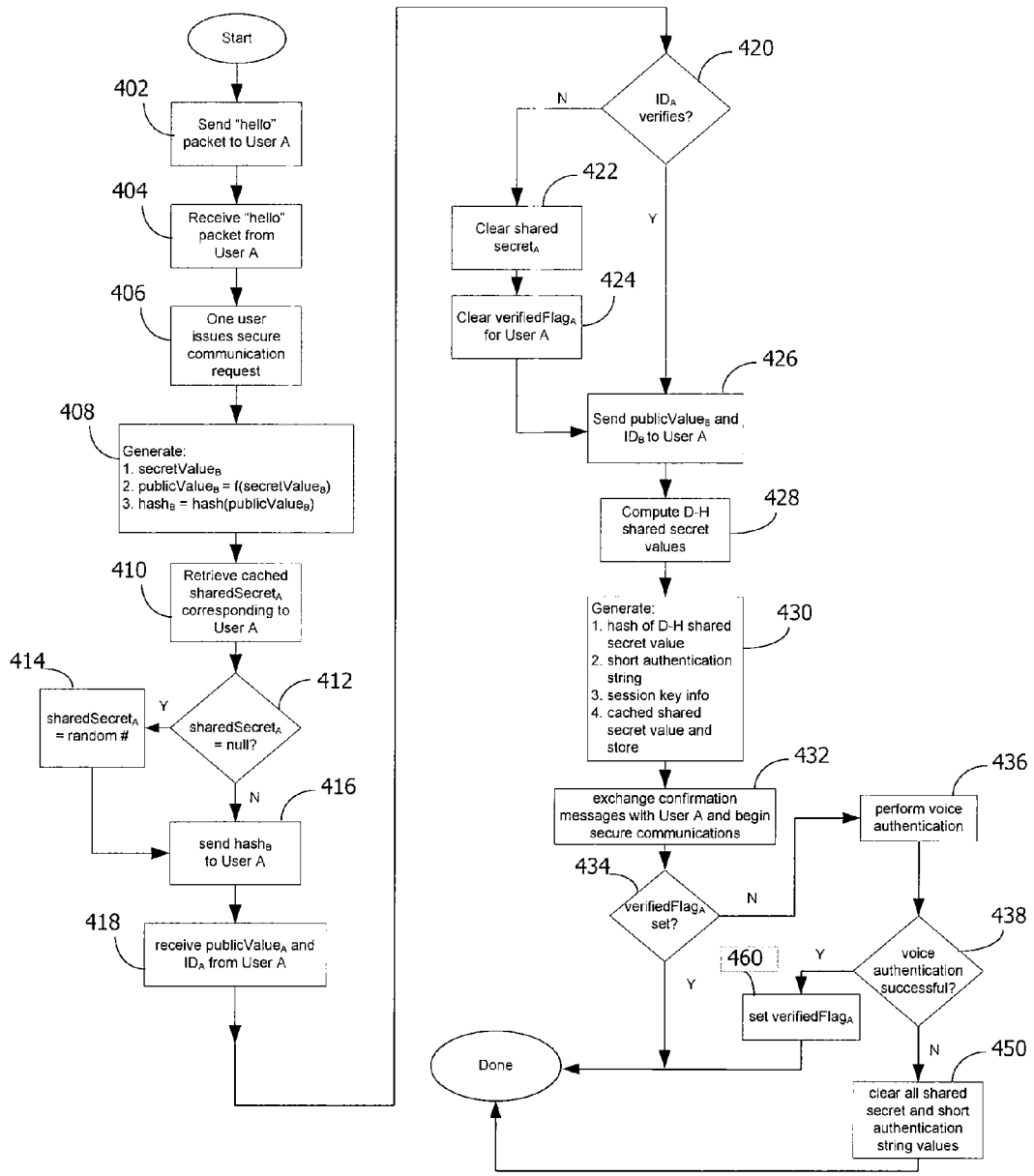
FIG. 4 is a detailed flow chart of authentication in a VOIP system using key continuity, according to another embodiment of the invention.

FIG. 4 depicts, in further detail, the ZRTP process described in the above protocol sequence. In a step 402, the initiator of a call (User B) sends a notification (or "hello") packet to User A. In the event User A wishes to communicate with User B, User A can send a response "hello" packet to User B in a step 404.

In the Zfone embodiment, the Hello packet can contain the Zfone version information, and can also include a list of supported crypto-related algorithms and parameters. This allows the two users to select the hash algorithm, the block cipher, and the key exchange algorithm. Each negotiated parameter is presented as a list of algorithms or key sizes in the order of preference, with the most preferred appearing first. In each list, the first algorithm listed in the initiator's list that also appears anywhere in the responder's list is agreed to as the algorithm to use.

For example:

```
Zfone-v1.0, (SHA256), (AES256,AES128), (DH4096=xxxxxxxx,
    DH3072=xxxxxxxx), ID=xxxxxxxxxxxxxxxxxxxxxxxx
or:
Zfone-v1.0, (SHA256), (AES256), (DH4096=xxxxxxxx),
    ID=xxxxxxxxxxxxxxxxxxxxxxxx
```

In this example, the DH primes are specified by their size and by a 32-bit truncated SHA256 hash of the prime itself. Here 32 bits is more than enough, because only a small number of primes is expected. The ID=field is the hex value of the ZfoneID (which is discussed in further detail below).

At this point, either user can issue a secure communication request at step 406. Upon such a request being issued, three different values can be generated for User B in a step 408. First, a secret value for User B is generated (denoted "secretValue$_B$" or "svb" in the protocol description above). In an embodiment, secretValue$_B$ can be a random number. The ZRTP protocol uses random numbers for cryptographic keying material, particularly for the DH secret exponents, which can be generated for each VOIP communication session. Whenever a random number is desired, certain criteria should be satisfied. The random number should be derived from a physical entropy source, such as RF noise, acoustic noise, thermal noise, high resolution timings of environmental events, or other unpredictably physical sources of entropy. The raw entropy should be distilled and processed through a deterministic random bit generator (DRBG). The random number should be freshly generated, meaning that it has not been used in a previous calculation. The random number should be greater than or equal to two, and less than or equal to $2^L-1$, where L is the number of random bits required. The random number should be chosen with equal probability from the entire available number space, e.g., $[2, 2^L-1]$.

Next, a public value is computed (denoted "publicValue$_B$" in FIG. 4) that is a function of secretValue$_B$ and that can be used to produce the keying material for securing the VOIP communication session between the users. In an embodiment, a public key agreement algorithm can be used as the function, such as the well known Diffie-Hellman algorithm. In such a case, secretValue$_B$ could be used as an exponent in the classic DH calculation [g ^ secretValue$_B$ mod p], where g and p are the chosen DH constants for the two users. Finally, a hash of value of publicValue$_B$ (denoted "hash$_B$" in FIG. 4) is generated for use later in authenticating User B to User A.

In a step 410, a cached (or retained) shared secret for User A is retrieved (denoted "sharedSecret$_A$" or "rs0" in the protocol sequence above). If no previous session occurred between User A and User B, sharedSecret$_A$ is null. In the check performed in a step 412, if the existing sharedSecret$_A$ is null, the new value of sharedSecret$_A$ is set to a random number in a step 414. In an embodiment, a ZfoneID value is used to look up retained shared secrets in the local cache. Each installation of ZRTP has a unique 96-bit random ZfoneID that is generated once at installation time. It should not change after that.

In an embodiment, a single global ZfoneID for a single Zfone installation can be used, and may be required in applications where the encryption is being done by a proxy (e.g., "bump in the cord") that does not know who is being called. Such a single global ZfoneID, however, is specifically not precluded for an implementation to use multiple ZfoneIDs, up to the limit of a separate one per callee. This then turns the single global ZfoneID into a long-lived association ID that does not apply to any other associations between a different pair of parties. The ZRTP protocol permits both options to interoperate freely.

In a step 416, hash$_B$ is sent to User A. User B then receives publicValue$_A$ and ID$_A$ from user A in a step 418. When adding the complexity of additional shared secret values beyond the familiar DH key agreement, the lack of availability of the cached shared secret cannot prevent a call from going through. In addition, false alarms that claim an attack was detected should be prevented. This can be accomplished by sending a code during call setup that allows both parties to detect whether they share a cached secret with high confidence. This can also be thought of as a session ID, which is denoted ID$_A$ for user A ("rsID_A" in the protocol description above).

The value of ID$_A$ and the corresponding ID$_B$ value for User B ("rsID_B" in the protocol sequence above) are structured in such a way that by incorporating the shared secret value between the users, ID$_A$ and ID$_B$ each give the other user the assurance that he or she is communicating with the same person as last time. In an embodiment, ID$_A$ and ID$_B$ can be calculated by performing an HMAC on the sharedSecret value of the particular user in combination with some fixed data, such as a text string indicating the role of that user. For example, User B as the initiator could perform an HMAC on sharedSecret$_B$, combined with the text string "Initiator."

In general, if the two users can retrieve the cached shared secret from their previous session, they can detect this in the current session by sending the session ID (i.e., ID$_A$ and ID$_B$) which is derived from the cached shared secret if it exists, or set to a random value if they did not share an earlier session. Note that ZRTP purposefully results in the computation of unequal session ID values for the two parties by including a tag that specifies their initiator or responder role in the computation. The two parties can each check for an session ID match by computing the expected value from the role of the other party. If the session IDs were computed from dummy random values because no cached shared secret value was retained, then the session IDs will fail to match their expected values.

Computing the session IDs to be unequal hides from any attacker (e.g., an eavesdropper or MitM) the fact that the two parties have a common cached shared secret. This further obfuscates when the risk of attempting a MitM attack on the DH exchange is worthwhile. If the attacker knew for sure that a cached shared secret was not possessed by the users, the attacker might think the risk of a MitM attack would be worthwhile, hoping that the users will be too lazy to check the short authentication string. By denying the attacker this opportunity to attack selectively only when the risk is lowest, the attacker would be forced to risk automatic exposure if indeed a cached shared secret was present.

Thus, in a step 420, a check is performed for User B to see whether ID$_A$ properly corresponds to a cached shared secret for User A. If not, sharedSecret$_A$ can be cleared in a step 422 and verifiedFlag$_B$ can be cleared in a step 424. This will require the users to perform a voice authentication to avoid the MitM attack, since a shared secret was not available. Now that User B has received the publicValue$_A$ and ID$_A$ from User A, User B then transmits publicValue$_B$ and ID$_B$ to user A in a step 426.

In a step 428, a public-key based shared secret value is computed. In an embodiment, this could be a DH calculation, where both users could use the DH public parameters p (the modulus) and g (the generator), as specified in the Request for Comment (RFC) 3526 from the Internet Engineering Task Force (IETF). In an embodiment, the prime modulus p could be 4096 bits and g could be set to the value 2. For the DH secret values (sva and svb in the protocol sequence above), random 512-bit exponents could be used.

The use of a retained shared secret does not, by itself, eliminate the need to display and verify the short authentication string. A simple MitM attack can still be mounted by an attacker who has previously established separate retained shared secrets with both User A and User B. The attacker would do this by calling User A, without trying to impersonate anyone, having a nice friendly chat with her, verifying the short authentication string with her, and hanging up. Then he would perform the same ritual with User B, again not trying to impersonate anyone. Now he can mount a classic DH MitM attack between User A and User B, and neither will bother to check their short authentication strings, because they see that a retained shared secret was previously established with the other user (who happens to be the MitM in both cases). The reason why this attack could work is that a ZfoneID and retained shared secret have not been linked with the identity of the other user. Thus, the users should check the short authentication string on every call, or tell the user to whom he or she is speaking, based on the ZfoneID. In an embodiment, the user would see the name and a photo of the other party displayed, and would recognize an unexpected identity.

In an embodiment, the Zfone application maintains an address book to deal with this issue, with vCard-format address records (in accordance with RFC 2426) of each user with whom the user wishes to maintain an ongoing relationship. The ZfoneIDs and retained shared secrets are indexed with the address book entry for that user, so that each user always knows to whom he or she is talking, and always knows that a ZfoneID and retained shared secret goes with the expected party. Users could also transmit their vCards to other users during a call, but the recipient will decide whether to accept or reject the vCard record, (to prevent someone from providing a misleading vCard record). In one embodiment, a user can be allowed to type what the user believes to be the name of the other party into a vCard record, (analogous to a "nickname"), to make it harder for the other party to present a misleading vCard record. Only after a vCard record has been created will the user be allowed to click a verified button, to ensure a linkage between an identity and a retained shared secret. Without such an identity linkage, saving a verified flag with a retained shared secret could actually weaken security.

Using the result from step 428, a short authentication string is computed and stored in step 430 by hashing the public portions of the public key values from this session (publicValue$_A$ and publicValue$_B$), and session key information is also computed in step 430. Also, a cached shared secret value is computed and stored. The session key is also computed in step 430 from the DH result and the cached shared secret. The short authentication string (also known as a voice authentication digest, "VAD", or "vad") is a value that can be used by each user to authenticate verbally a particular VOIP communication session. The two users can compare them verbally and thereby authenticate a particular VOIP session.

An added benefit of using the cached shared secret in generating the session key information in step 430 is that the shared secret augments the entropy of the session key information. For example, the Zfone embodiment could utilize a 256-bit AES key. Even if limits on the size of the DH exchange produce a session key with less than 256 bits of real work factor, however, the added entropy from the cached shared secret can bring up all the subsequent session keys to the full 256-bit AES key strength.

In an embodiment, an HMAC key can be generated at the same time as the other session key information is generated. This HMAC key can be used if anything needs to be sent over the protocol which needs HMAC protection, such as a file transfer. For purposes of security, the HMAC key can be erased at the end of the call, along with other internal key generation values.

In a step 432, a confirmation message can be exchanged between User B and User A, followed by secure communications via encryption of the VOIP packets. Specifically, in an embodiment, the VOIP packets can be encrypted with the Secure Real Time Protocol ("SRTP," as specified in RFC 3711). SRTP uses either a 128-bit or 256-bit AES key and a 112-bit salt for initialization, and runs the AES block cipher in counter mode to encrypt the VOIP packets. Other block ciphers may be used by SRTP in place of the AES.

As soon as an encrypted session is established, each user can send its own local VAD verified flag from the previous call to the other user in a confirmation message packet. Each user can thus detect if the local verified flag and the remote verified flag are both set from any previous calls. This indicates that the short authentication string procedure is not needed to authenticate the current call. Thus, the ZRTP implementation of both users should achieve one good short authentication string procedure before that procedure can be omitted in future sessions between the users.

Further, note that the notification of the remote user's verified flag is done under the cloak of SRTP encryption, so an eavesdropper cannot learn which users are lazy on checking if their short authentication string matches.

In a step 436, voice authentication can be performed. In an embodiment, this can be each user reciting to the other user the value of the short authentication string that was computed in step 430. In an embodiment, a user interface element in the software (e.g., a button or a checkbox) can be used to allow the user to tell the software the short authentication string verify was successful, which would follow the check in a step 438. This can cause the software to set the verified flag in a step 460, which (together with the cached shared secret) obviates the need to perform the short authentication string procedure (i.e., voice authentication) in the next call. An additional user interface element can be used to allow the user to indicate to the software that the user detected an actual short authentication string mismatch, which indicates a MitM attack. The software can then take appropriate action (e.g., clearing the verified flags and erasing the cached shared secret from this session, as shown in a step 450).

If the voice authentication is successful (i.e., the short authentication string matches), the verified flag can be set in a step 460. Also, no MitM exists and the MitM will be locked out of subsequent calls. If inattentive users don't bother to check the short authentication string, the existence of a MitM will not be detected, so if a new cached shared secret is established, a risk exists that a potential attacker may have a subsequent opportunity to continue eavesdropping, until the users finally check the short authentication string. If the short authentication string matches, no attacker was present for any previous session since first propagating cached shared secrets, because this session and all the previous sessions were also authenticated with a continuous lineage of shared secrets.

If at any time the users carry out the short authentication string procedure and it actually fails to match, a very resourceful man in the middle exists. If this is the first call, the MitM was on the first call. If it happens in a later call, the MitM also knows the cached shared secret between the users, because the users could not have carried out any voice traffic at all unless the session key was correctly computed and is also known to the attacker. This implies the MitM has been present in all the previous sessions since the initial establishment of the first shared secret. Also, if at any time the attacker ceases its participation as a MitM on one of the calls between the users, the protocol will detect that the cached shared secret is no longer valid, since the MitM attack would actually have resulted in two different shared secrets all along, one of them between User A and the attacker, and the other between the attacker and User B. The continuity of the cached shared secrets make it possible for ZRTP to detect the MitM when the MitM inserts himself into the ongoing relationship, as well as when he leaves. Also, if the attacker tries to stay with a long lineage of calls, but fails to execute a DH MitM attack for even one missed call, the MitM will be detected and will also be permanently excluded. He can no longer resynchronize with the chain of cached shared secrets.

Figure 5:
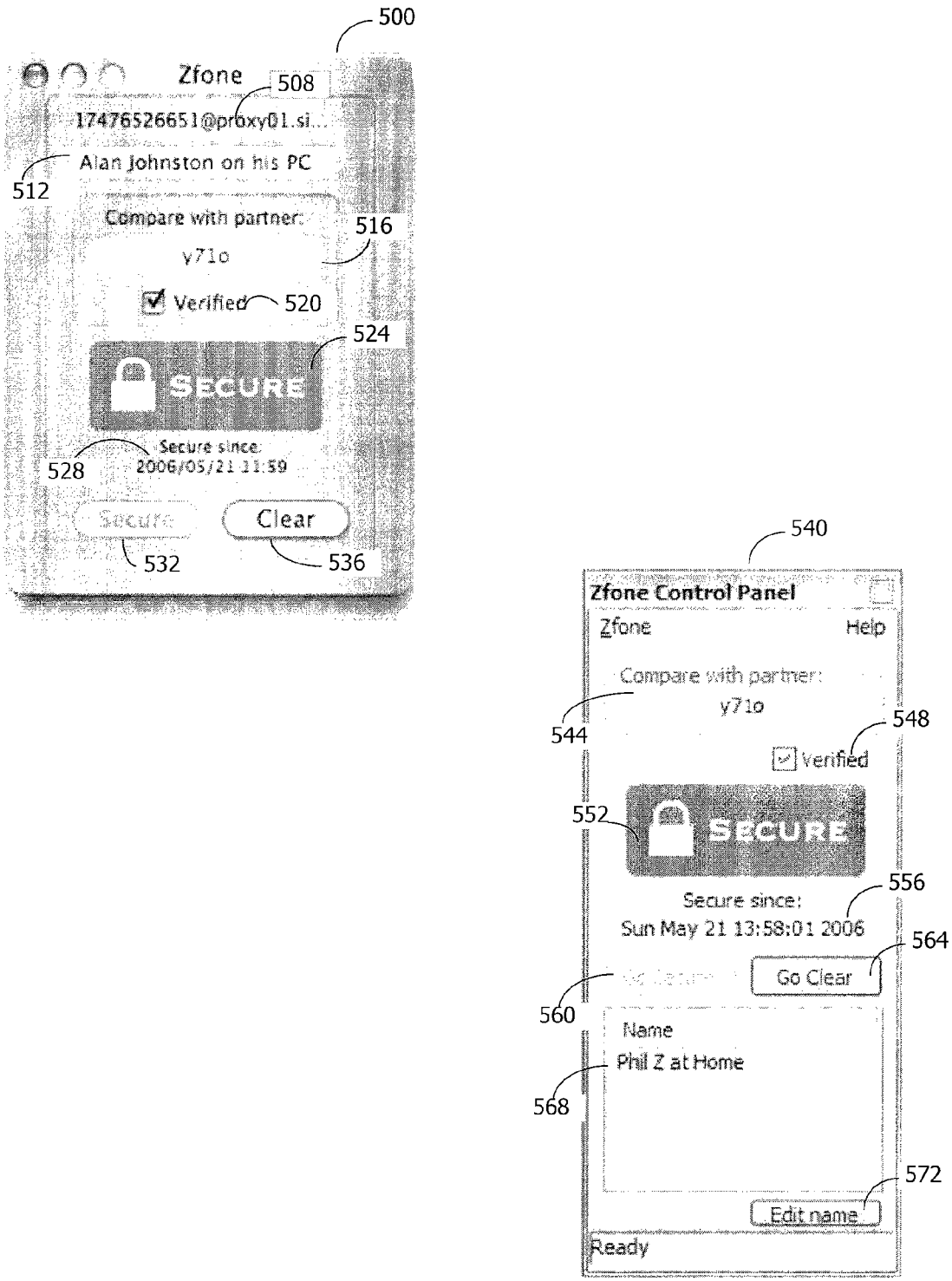
FIG. 5 depicts an exemplary user interface of the invention.

FIG. 5 illustrates examples of two different user interfaces for the Zfone. Each user interface 500 and 540 contains similar fields. In user identity field 512 and 568, each Zfone user can enter a personalized identification or reminder of the other user (i.e., upon a successful short authentication string verification, the Zfone user can enter any text that will remind the user to whom he or she is speaking). In short authentication string field 516 and 544, the short authentication string generated by each user can be displayed and compared. Again, upon a successful short authentication string verification, the Zfone user can check the Verified box 520 and 548 to indicate to the software that future short authentication string verification strings are not necessary. The Secure box 524 and 552 will indicate the security status of the VOIP communication session, where the two main states could be Secure or Clear. Additional information in the user interface could include:

- the date 528 and 556 that the users last performed a short authentication string verification;
- a Secure (or Go Secure) button 532 and 560 to allow the user to indicate the user's desire to go into a secure mode; and
- a Clear (or Go Clear) button 536 or 564 to allow the user to indicate the user's desire to go into a clear mode.

For Secure VOIP products that lack a GUI, such as a local network proxy server that implements SRTP, voice prompts can tell the user when the call is secure and when it is not secure (the latter being especially important, to discourage in-band spoofing of voice prompts by an attacker). Voice prompts also can tell the user what to say aloud for the short authentication string verify procedure. The biometric word list developed for PGPfone and subsequently used for reading PGP key fingerprints aloud can be used. Each user would have to say only two words from the list, which makes it easy for a voice prompt to tell him what to say and have him remember it. This would be cognitively easier than making him say and check letters or digits.

Mobile communication products can be made with a push-to-talk (PTT) capability, like a walkie-talkie. To make secure PTT products, a cached shared secret would be especially useful, so a new DH key agreement would not be needed each time someone talks. In that case, some sort of key setup procedure could be done one time, such as for example a DH key exchange, complete with a short authentication string verify procedure. Subsequent PTT dialog would be based entirely on the cached shared secret, and would not need to include further DH steps.

Set forth in detail above are aspects of at least one embodiment of the invention. Each of the features set forth above may be implemented in one system, method, processor-readable medium, and/or computer executable code in accordance with an embodiment of the invention. Alternatively, each of the features set forth above may be separately implemented in different systems, methods, processor-readable medium, and/or computer executable codes in accordance with embodiments of the invention.

The embodiments described herein are to be regarded as illustrative rather than restrictive. Others may make variations and changes, and equivalents employed. Accordingly, it is expressly intended that all such variations, changes and equivalents that fall within the foregoing claims be embraced thereby.

The invention claimed is:

1. A method, comprising:
negotiating in a media path a cryptographic key exchange between a first user and a second user to compute session keys for Secure Real Time Protocol (SRTP) Voice Over Internet Protocol (VOIP) media streams;
computing a Short Authentication String (SAS) from the cryptographic key exchange between the first user and the second user, wherein computing includes computing the SAS in such a manner as to constrain a Man-In-The-Middle attack to one guess;
displaying the SAS to the first user and the second user such that an SAS mismatch indicates existence of a Man-In-The-Middle attack;
caching cryptographic key material created by the first user and the second user in a first communication session;
invoking the cryptographic key material in a second communication session between the first user and the second user, thereby establishing key continuity; and
augmenting cryptographic key material in the second communication session between the first user and the second user with the cryptographic key material from the first communication session.

2. The method of claim 1 further comprising:
caching entropy from the first communication session between the first user and the second user; and
augmenting entropy for session key generation in the second communication session between the first user and the second user with entropy from the first communication session.

3. The method of claim 1 wherein negotiating is performed by a proxy positioned between a client device and a network.

* * * * *